(12) United States Patent
Stabler et al.

(10) Patent No.: US 12,488,189 B2
(45) Date of Patent: Dec. 2, 2025

(54) METHOD AND SYSTEM FOR FACILITATING AN ENHANCED SEARCH-BASED INTERACTIVE SYSTEM

(71) Applicant: Palo Alto Research Center Incorporated, Palo Alto, CA (US)

(72) Inventors: Edward P. Stabler, Colwood (CA); Charles L. Ortiz, Jr., Fremont, CA (US); Gaurang R. Gavai, San Francisco, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 297 days.

(21) Appl. No.: 17/977,655

(22) Filed: Oct. 31, 2022

(65) Prior Publication Data

US 2024/0143935 A1 May 2, 2024

(51) Int. Cl.
*G06F 40/35* (2020.01)
*G06F 16/334* (2025.01)

(52) U.S. Cl.
CPC .......... *G06F 40/35* (2020.01); *G06F 16/3344* (2019.01)

(58) Field of Classification Search
CPC ......... G06F 40/35; G06F 16/334; G06F 16/33
See application file for complete search history.

(56) References Cited

U.S. PATENT DOCUMENTS

| | | | |
|---|---|---|---|
| 9,336,302 B1 | 5/2016 | Swamy | |
| 9,633,007 B1 | 4/2017 | Brun | |
| 2012/0131557 A1* | 5/2012 | Davies | G06F 9/453 717/125 |
| 2012/0209751 A1 | 8/2012 | Chen | |
| 2012/0278064 A1 | 11/2012 | Leary | |
| 2016/0085855 A1 | 3/2016 | Clark | |
| 2020/0234313 A1 | 7/2020 | Sheth | |
| 2020/0302019 A1* | 9/2020 | Hall | G10L 15/22 |
| 2020/0327285 A1 | 10/2020 | Cox | |

(Continued)

OTHER PUBLICATIONS

Raghu, Dinesh, Shantanu Agarwal, and Sachindra Joshi. "End-to-end learning of flowchart grounded task-oriented dialogs." arXiv preprint arXiv:2109.07263 (Year: 2021).*

*Primary Examiner* — Bhavesh M Mehta
*Assistant Examiner* — Jangwoen Lee
(74) *Attorney, Agent, or Firm* — Shun Yao; Yao Legal Services, Inc.

(57) ABSTRACT

Embodiments described herein provide a system for facilitating efficient troubleshooting for a product. During operation, the system can identify an artificial-intelligence- (AI-) based dialog model operating based on a structured representation, which can indicate sequential troubleshooting steps to be performed by a user. The system can provide a machine utterance of the dialog model corresponding to a troubleshooting step to the user. The system can then search the structured representation for a semantic match for a user utterance obtained in accordance with the dialog model from the user. If the semantic match indicates an anticipated option associated with the machine utterance, the system can traverse a current branch of the structured representation using the dialog model based on the anticipated option. Otherwise, if the semantic match indicates an option on a different branch, the system can jump to the option on the different branch for subsequent traversal.

20 Claims, 10 Drawing Sheets

(56) References Cited

U.S. PATENT DOCUMENTS

2021/0150594 A1    5/2021  Zhu
2021/0287260 A1*  9/2021  Cheah ................. G06F 16/3329
2023/0020613 A1*  1/2023  Drory ................. H04M 3/5191

* cited by examiner

METHOD AND SYSTEM FOR FACILITATING AN ENHANCED SEARCH-BASED INTERACTIVE SYSTEM

BACKGROUND

Field

This disclosure is generally related to the field of automated systems. More specifically, this disclosure is related to a system and method for facilitating an efficient search-based interactive troubleshooting system.

Related Art

A troubleshooting system can be a computer-based system that can automatically traverse a solution space of a problem (e.g., an issue with a piece of software) based on user interaction, such as user speech, touch, gesture, etc. Many companies producing and maintaining equipment may maintain flowcharts for troubleshooting their equipment. Because the equipment can be complex with a large number of possible issues, such a flowchart can be large. As a result, if the system uses the flowchart to facilitate automated troubleshooting, the process of discovering the issue and providing a solution can be tedious and inefficient.

Furthermore, end-user- and technician-oriented flowcharts are also often generated with the consideration that the observations of the troubleshooter can be incorrect. In addition, some of the repair steps indicated in a flowchart may not observable. Consequently, the troubleshooter may think that a step has been completed even though the step may remain incomplete. Hence, the system may need to track whether the step is properly completed by the troubleshooter. Incorporating such features into an automated system can be challenging.

A troubleshooting solution can also be provided in a "how-to" video that may depict step-by-step actions needed to solve a particular problem. Hence, the how-to videos are different from a flowchart-based solution, which can present different paths to a diagnosis. As a result, if a problem is not initially understood, the how-to videos may not be suitable for providing a solution for the problem.

SUMMARY

Embodiments described herein provide a system for facilitating efficient troubleshooting for a product. During operation, the system can identify an artificial-intelligence- (AI-) based dialog model operating based on a structured representation associated with the troubleshooting for the product. The structured representation can indicate sequential troubleshooting steps to be performed by a user. The system can provide a machine utterance of the dialog model corresponding to a troubleshooting step for the product to the user. The system can then search the structured representation for a semantic match for a user utterance obtained in accordance with the dialog model from the user. If the semantic match indicates an anticipated option associated with the machine utterance, the system can traverse a current branch of the structured representation using the dialog model based on the anticipated option. On the other hand, if the semantic match indicates an option on a different branch of the structured representation, the system can jump to the option on the different branch for subsequent traversal.

In a variation on this embodiment, the structured representation can include one or more of: an acyclic flowchart and an influence diagram derived from the acyclic flowchart.

In a variation on this embodiment, a respective troubleshooting step in the structured representation can include a sequence of a machine utterance node, an observation node, and a set of user utterance nodes. Here, a respective user utterance node can correspond to an anticipated option.

In a variation on this embodiment, the system can maintain respective embeddings of a pre-trained language model for nodes of the structured representation.

In a further variation, the system can search the structured representation for the semantic match by searching the user utterance against the embeddings and identifying a node of the structured representation whose embedding provides a target match.

In a variation on this embodiment, to jump to the option on the different branch, the system can perform a set of independent checks on the user utterance. Upon obtaining validation from the set of independent checks, the system can proceed with the jumping.

In a further variation, the set of independent checks can include one or more of: polarity validation in the user utterance, quantity normalization in the user utterance, and a confirmation from the user based on a notification indicating the option on the different branch.

In a variation on this embodiment, the semantic match can indicate the option on the different branch of the structured representation by matching the option on the different branch based on a knowledge base derived from prior expert knowledge.

In a variation on this embodiment, the dialog model is augmented with dialog maintenance.

BRIEF DESCRIPTION OF THE FIGURES

In the figures, like reference numerals refer to the same figure elements.

DETAILED DESCRIPTION

Figure 1A:
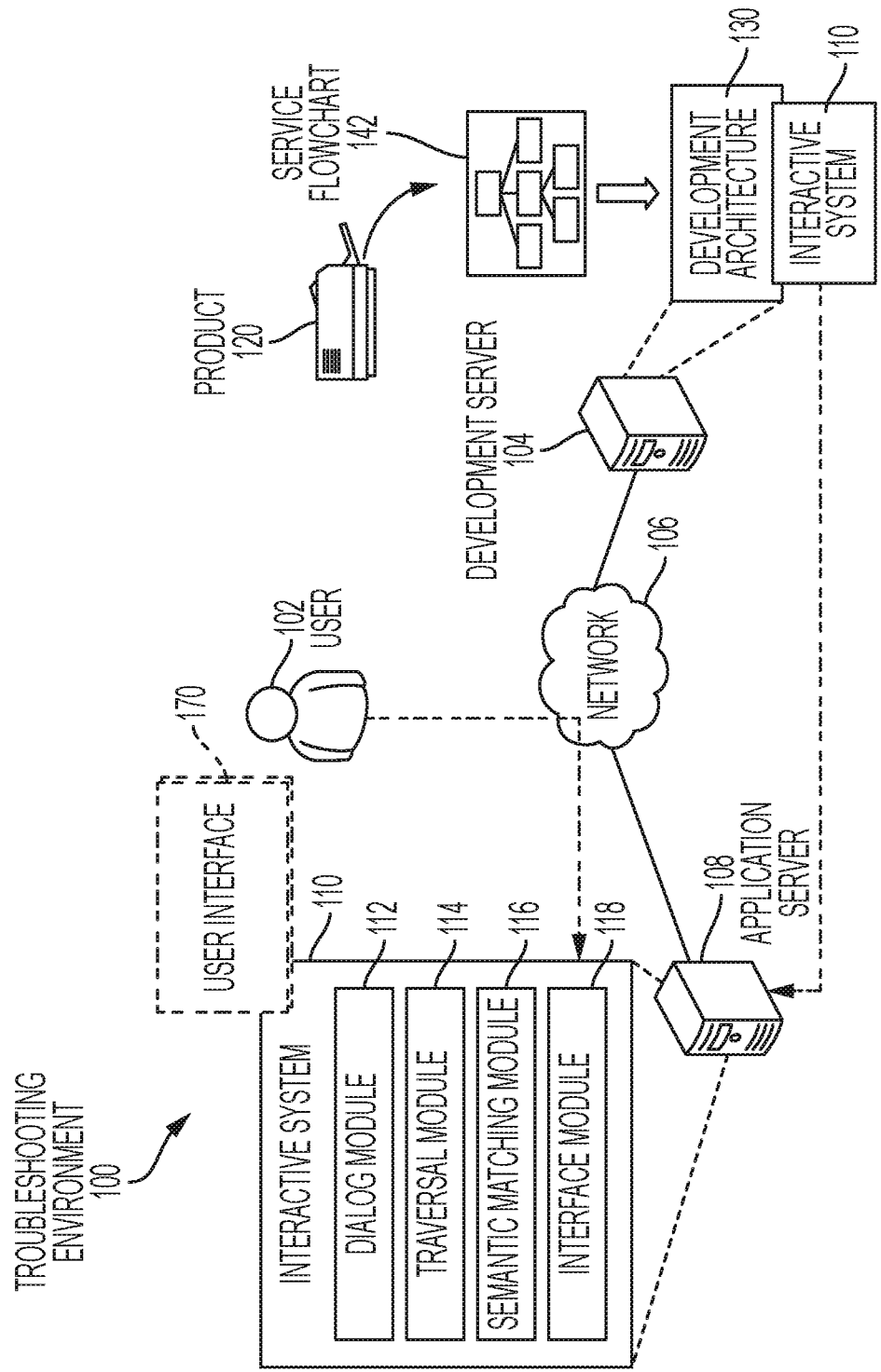
FIG. 1A illustrates an exemplary troubleshooting environment that includes an efficient search-based interactive system for troubleshooting, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of quickly reaching a troubleshooting solution from an interactive system by (i) enhancing the interactive system with an accurate and efficient semantic searching process based on in-context embeddings of an artificial intelligence (AI) model, and (ii) training the semantic searching process using domain knowledge for facilitating quick discovery. The system can provide solutions to different issues associated with one or more products based on corresponding structured representations, such as service flowcharts (e.g., derived from respective manuals), that can dictate how to troubleshoot the corresponding products. The semantic searching allows the system to quickly converge to a likely solution based on arbitrary utterances from a user without traversing tedious and possibly erroneous paths of the corresponding flowchart.

With existing technologies, a troubleshooting system, which typically includes a task-oriented dialogue model, can require an expert to anticipate how dialogues with a user may proceed. Such anticipation may not be reflective of how individual users may approach a problem. Furthermore, if the system uses natural language processing (NLP), such as a task-oriented end-to-end neural dialogue system with knowledge-base access, such a system may require prior training with a large number of words and dialogs for a few tasks. Even with an extensive dataset and limited tasks, the system may achieve low accuracy. The system can also include a pre-trained language model, which may also require predicting user utterances. Since the same phrase (e.g., a cover) can correspond to different elements for different products, using a pre-trained language model can be challenging.

To solve this problem, embodiments described herein provide an enhanced interactive system that can efficiently search for a solution (i.e., troubleshoot) for an issue associated with a product based on arbitrary utterances of a user. During operation, a development architecture can obtain a structured representation, such as a service flowchart, for the product. For example, a service flowchart for a printer can provide step-by-step approaches indicating how different issues for the printer can be resolved. Hence, a service flowchart can also be referred to as a troubleshooting flowchart.

The development architecture can then incorporate a trainable and explainable dialogue model into the interactive system based on the flowchart. Typically, such a model can be more efficient than a flowchart because the model may allow a user to find a solution with fewer steps and interventions. The development architecture can determine the natural language descriptions of the steps of the flowchart and classify them as machine utterance (e.g., an option offered by the interactive system), user utterance (e.g., a response offered by the user), and observation (e.g., the next step or solution reached).

The development architecture can then represent the classified steps based on corresponding in-context embeddings of a language model. A respective embedding can represent a phrase associated with a step using a vector with a large number of dimensions. Typically, the vector can encode the meaning of the phrase such that the phrases with similar meanings can be close to each other in the vector space. Subsequently, the development architecture can determine an influence diagram for efficient traversal of the flowchart. The influence diagram can represent the information of the flowchart in its entirety.

The development architecture can then incorporate a semantic search option for a dialog (e.g., an arbitrary utterance) offered by the user based on the embeddings. The search can allow the interactive system to identify a step more relevant to the utterance compared to a current traversal path of the flowchart and directly "jump" to the identified step. For a jump step, the interactive system can notify the user regarding the jump step so that the user can remain aware of the jump. Hence, the underlying graphical model of the service flowchart can be transformed from being fixed and restrictive to flexible and searchable. In some embodiments, the development architecture can use a causal sketch to guide the restructurings associated with the jump.

The development architecture can further enhance the searching process by training the interactive system based on the knowledge base that may include the expertise of a specialist (e.g., a technician). The knowledge base can include the likely causes of specific issues, as identified by the specialist. In particular, the development architecture can adjust the influence diagram using the knowledge base and train the influence diagram accordingly (e.g., using a standard method for training influence diagrams). For example, if the issue is the appearance of white lines on color printouts, a specialist can identify the specific area of the printer causing the problem based on experience. The training of the influence diagram can then allow the interactive system to skip all the steps from the root to the relevant step and directly present the issue to the user.

The interactive system can include an interface that can be used to interact with the user. For example, the interface can be a hands-free voice interface capable of providing an audio prompt to a user in a natural language (e.g., in English) and receiving a voice input from the user (e.g., an arbitrary utterance from the user). The interactive system can also include a speech recognition module to identify the content of the voice input. Accordingly, the interactive system can determine the input and how to proceed at a respective step based on the natural language descriptions of diagnosis and repair steps. Hence, the interactive system can operate without being limited by a formal model of the device. In this way, the interactive system can efficiently facilitate search-based troubleshooting for a product.

Exemplary Watermarked System

FIG. 1A illustrates an exemplary troubleshooting environment that includes an efficient search-based interactive system for troubleshooting, in accordance with an embodiment of the present application. In this example, a troubleshooting environment 100 can allow a user 102 to efficiently troubleshoot for a product 120. Examples of product 120 can include, but are not limited to, a device, an appliance, a part of a device or appliance, a piece of software, and a tool. A troubleshooting guide for product 120 can include manual and service flowcharts for user 102. Typically, such flowcharts can include acyclic paths to a solution with several steps. At each such step, user 102 can be offered a number of choices.

With existing technologies, the troubleshooting guide can be automated and computerized into a troubleshooting system for product 120. For example, the traversal process through the flowchart can be automated for the troubleshooting system, which can then allow a user to follow the rigid structure of the flowchart to resolve an issue associated with product 120. As a result, traversing through different steps of different paths of the flowchart can make the troubleshooting system inefficient. In addition, if the troubleshooting system includes a task-oriented dialogue model, it can require an expert to anticipate how dialogues with user 102 may proceed. Such anticipation may not be reflective of how user 102 may approach the problem.

To facilitate the automation process, the troubleshooting system uses NLP, such as a task-oriented end-to-end neural dialogue system with knowledge-base access, to communicate with user 102. However, the troubleshooting system may then require prior training with a large number of words and dialogs for a few tasks. Even with an extensive dataset and limited tasks, the troubleshooting system may achieve low accuracy while processing utterances from user 102. The troubleshooting system can also include a pre-trained language model, which may also require predicting utterances from user 102. Since the same phrase (e.g., a cover) can correspond to one element in product 120 while corresponding to another element in another product, using a pre-trained language model can be challenging.

To solve this problem, an enhanced interactive system 110 can efficiently search for a solution (i.e., troubleshoot) for an issue associated with product 120 based on arbitrary utterances of user 102. During operation, a development architecture 130 can obtain a structured representation, such as service flowchart 142, for product 120. Development architecture 130 can include a development platform that allows a developer to design and implement interactive system 110. Development architecture 130 may support an integrated development system, facilitate flowchart parsing, and provide training to an artificial intelligence (AI) model (e.g., a dialog model).

Development architecture 130 can operate on a development server 104, which can be a physical device or a virtual machine (VM). Server 104 can be reachable via an application server 104 reachable via a network 106. Here, network 106 can be a local or wide area network, such as a virtual local area network (VLAN) or the Internet, respectively. An application server 108, which can be a physical device or a VM, can also be reachable via network 106. Development architecture 130 may deploy system 110 on server 108 (e.g., via network 106 or any other means).

To develop system 110, development architecture 130 can utilize flowchart 142. Flowchart 142 can offer different choices, each leading to a path, for troubleshooting the issue. For example, if product 120 is a printer, a respective path of flowchart 142 can provide step-by-step approaches indicating how the issue for the printer can be resolved. Flowchart 142 can specify the required observations and corresponding preferred solutions in a natural language, such as English and/or Spanish, at a respective step. By utilizing the semantic meaning of the phrases in flowchart 142, system 110 can facilitate troubleshooting based on a natural language using flowchart 142 without following the rigid structure of flowchart 142.

Accordingly, development architecture 130 can incorporate a dialog module 112 into system 110. Dialog module 112 can be based on a trainable and explainable dialogue model operable on flowchart 142. Here, dialog module 112 can be more efficient than flowchart 142 because the underlying model may allow user 102 to find a solution with fewer steps and interventions. Development architecture 130 can determine the natural language descriptions of the steps in flowchart 142 and classify them as machine operation (e.g., an option offered by system 110), user operation (e.g., utterance from user 102), and observation (e.g., the next step or solution reached). Development architecture 130 can then incorporate a traversal module 114 in system 110 that can traverse the options based on the classifications of the steps of flowchart 142.

Development architecture 130 can then represent the classified steps based on corresponding in-context embeddings of a language model and equip system 110 with a semantic matching module 116 capable of using the language model. A respective embedding of the language model can use a vector with a large number of dimensions to represent a phrase associated with a step of flowchart 142. Typically, the vector can encode the meaning of the phrase such that the phrases with similar meanings can be close to each other in the vector space. Subsequently, the development architecture can determine an influence diagram for efficient traversal of flowchart 142. The influence diagram can represent the information of flowchart 142 in its entirety.

Semantic matching module 116 can facilitate a semantic search option for a dialog (e.g., an arbitrary utterance) offered by user 102 based on the embeddings. The search can allow system 110 to identify a step more relevant to the utterance compared to a current traversal path of flowchart 142 and directly jump to the identified step. For a jump step, system 110 can notify user 102 regarding the jump step so that user 102 can remain aware of the jump. Hence, semantic matching module 116 can transform the underlying graphical structure (i.e., the paths) of flowchart 142 from being fixed and restrictive to flexible and searchable for system 110. In some embodiments, development architecture 130 can use a causal sketch to guide the restructurings associated with the jump. To efficiently train system 110 with the influence diagram, system 110 can be restricted to looking for "jump" steps that can quickly converge to a solution. With this option, the learning process may not diverge from the basic causal sketch that flowchart 142 can provide.

Development architecture 130 can further enhance the searching process by training system 110 based on the knowledge base that may include the expertise of a specialist (e.g., a technician). The knowledge base can include the likely causes of specific issues, as identified by the specialist, for product 120. In particular, development architecture 130 can adjust the influence diagram using the knowledge base and train the influence diagram using a standard method for training influence diagrams. Initially, the probability of selecting a particular choice in the influence diagram can be uniform (e.g., represented based on corresponding probability equations). When trained using the knowledge base, the probability can be adjusted based on the training. For example, if product 120 is a printer and the issue is the appearance of white lines on color printouts, the knowledge base can indicate the specific area of the printer causing the problem based on the experience of the specialist. The training can then allow semantic matching module 116 to skip all the steps from the root to the relevant step of flowchart 142 and directly present the issue to user 102.

System 118 can include an interface module 118 that can present an interface 170 to user 102 for interaction. For example, interface module 118 can provide a hands-free voice interface capable of providing an audio prompt to user 102 in a natural language (e.g., in English) and receiving a voice input from user 102 (e.g., an arbitrary utterance from user 102). Interface 170 can also include a display interface for showing the dialogs (e.g., the text of the machine utterances and the choices) and any relevant information (e.g., a warning). System 110 can use dialog module 112 to identify the content of the voice input from user 102. Accordingly, system 110 can determine the input using dialog module 112. System 110 can then determine how to proceed at a respective step based on the natural language descriptions of diagnosis and repair steps based on traversal module 114 and semantic matching module 116. Hence, system 110 can operate without being limited by a formal model of device 120. In this way, system 110 can efficiently facilitate search-based troubleshooting for product 120.

Figure 1B:
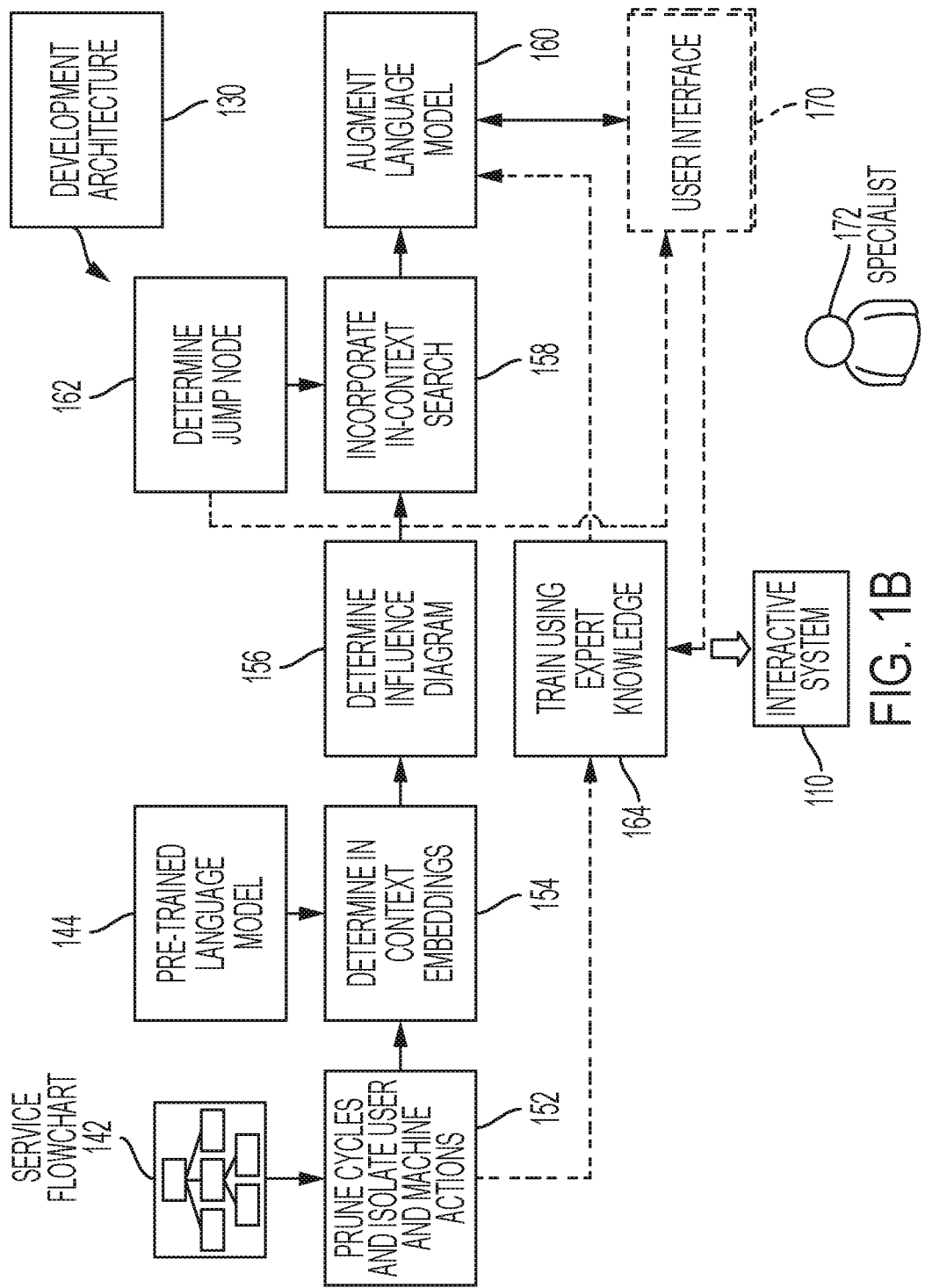
FIG. 1B illustrates an exemplary process of determining an efficient search-based interactive system for troubleshooting, in accordance with an embodiment of the present application.

FIG. 1B illustrates an exemplary process of determining an efficient search-based interactive system for troubleshooting, in accordance with an embodiment of the present application. To develop system 110, development architecture 130 can generate an intermediate representation of flowchart 142. To obtain the intermediate representation of flowchart 142, development architecture 130 can prune the cyclic "restart" edges to generate a directed acyclic graph (DAG). Development architecture 130 can then split each node in the DAG into three nodes: a machine utterance node, an observation node, and a user utterance node (operation 152). Subsequently, development architecture 130 can compute the embeddings of a pre-trained language model 144 for a respective node of the DAG (operation 154).

Development architecture 130 can also construct an influence diagram with prior weights that can allow system 110 to efficiently traverse flowchart 142 (operation 156). The influence diagram can be used for determining the user decision policies based on the machine utterance, observation, and user utterance nodes. Development architecture 130 can then incorporate searching capability into system 110 using the embeddings (operation 158). Accordingly, system 110 can use the embeddings for determining semantic matches (e.g., use cosine similarity). As a result, system 110 can support arbitrary utterances from a user and determine a corresponding choice based on the semantic match. In this way, the user can describe the problem to system 110 without being restricted to the choices offered by flowchart 142.

Based on the semantic match, development architecture 130 can also allow system 110 to jump to a different node (operation 162). Since the influence diagram can correspond to flowchart 142 and represent the options presented in flowchart 142 in their entirety, the influence diagram can be readily intelligible by specialist 172. Based on the feedback from specialist 172, the influence diagram can be adjusted to incorporate the probabilities of traversing a particular path in the influence diagram and facilitate the jump step. Unlike a shortcut targeting descendants of the current node, the target node of the jump can be on a different branch of the DAG. Development architecture 130 can incorporate a set of checks for the jump, which may include independent checks (or validations) for polarities, quantities, and histories, to ensure a semantically meaningful transition of the traversal process through the jump. Development architecture 130 can also incorporate a notification mechanism for system 110, which can notify the user regarding the change in the trajectory of the traversal due to the jump.

Development architecture 130 can also provide options for the maintenance of the dialogue model of system 110 (operation 160). For example, the dialog model can be augmented to include options for quit, repeat, revise, and restart. Development architecture 130 can also enhance system 110 with the capability to respond to why-questions and how-did-we-get-here questions from the user. System 110 can explore the paths in the influence diagram to determine the responses even if the history of the traversal is not maintained by system 110. Furthermore, user interface 170 can be further used for training system 110 with expert knowledge (operation 164). For example, if an expert is aware of a solution to a particular problem, that information can be incorporated into system 110. If the user's utterance corresponds to the problem, system 110 can jump to the solution based on the semantic match.

System Architecture

Figure 2A:
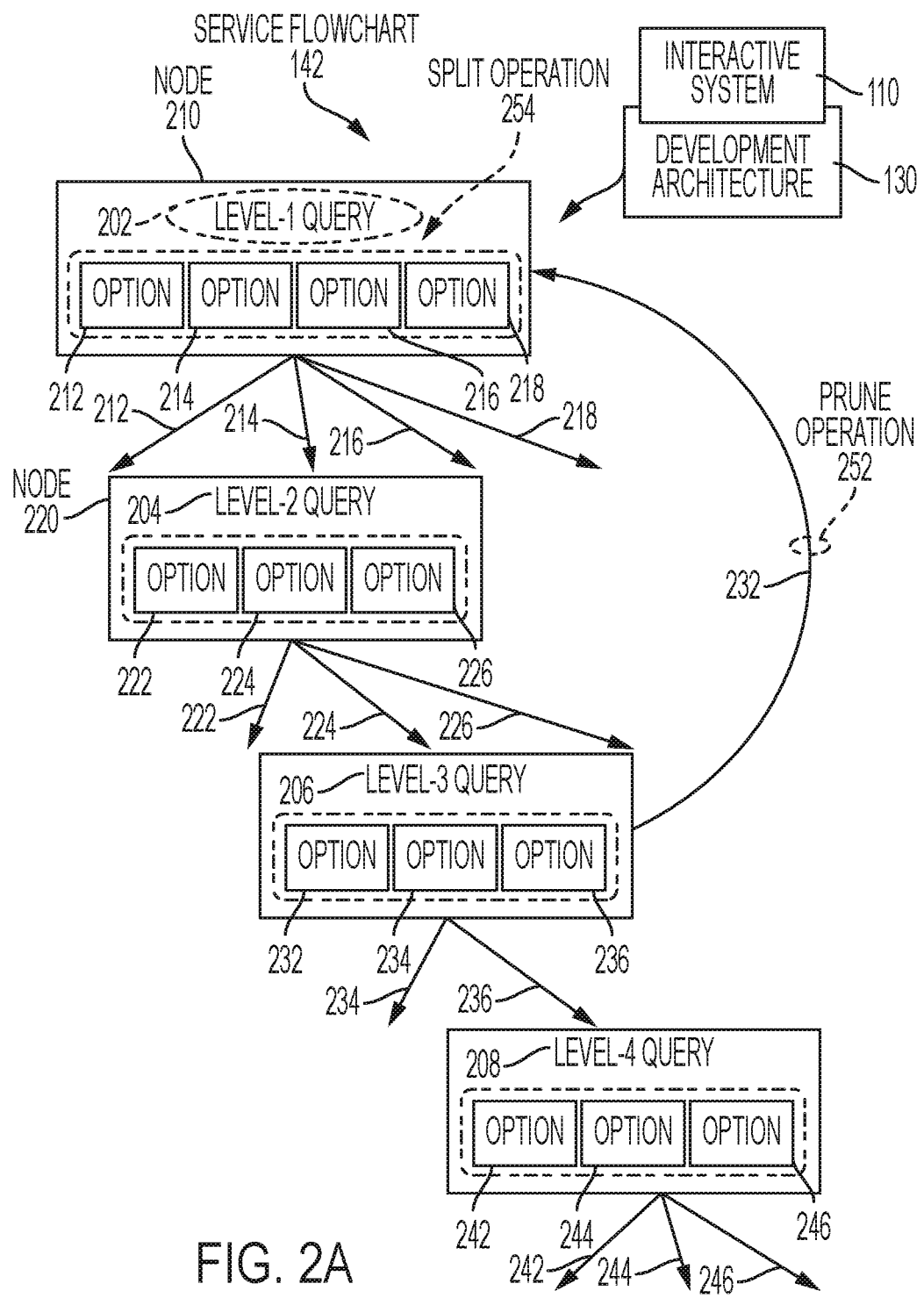
FIG. 2A illustrates an exemplary enhancement of a service flowchart for an efficient search-based interactive system, in accordance with an embodiment of the present application.

FIG. 2A illustrates an exemplary enhancement of a service flowchart for an efficient search-based interactive system, in accordance with an embodiment of the present application. In this example, flowchart 142 can include different levels of queries 202, 204, 206, and 208. Here, query 202 can be an initial or level-1 query asking which generic area of a product corresponds to an issue. There can be a number of options 212, 214, 216, and 218 as possible responses to query 202. Each of these options can correspond to a generic area. For example, if the product is a printer, options 212, 214, 216, and 218 can correspond to paper jam, image quality, printing, and toner/cartridge, respectively. For each of these options, flowchart 142 can include a subsequent query.

Query 204 can be a subsequent query (e.g., a level-2 query) for option 216 and can query about the source of the image quality issue. Here, option 216 and query 204 create a branch or path from query 202. Options 222, 224, and 226 can be the options or choices for a response to query 204. In flowchart 142, a respective query and the options associated with the query can appear in the same node. Query 202 and its options 212, 214, 216, and 218 can appear as a node 210 in flowchart 142. Similarly, query 204 and its options 222, 224, and 226 can appear as a node 220 in flowchart 142.

For each of options 222, 224, and 226, flowchart 142 can include a subsequent query, such as query 206 (e.g., a level-3 query) for option 224. Options 232, 234, and 236 can be the options or choices for a response to query 206. Here, option 232 can be a "restart" option that traverses back to query 202 and creates a cycle in flowchart 142. For options 234 and 236, flowchart 142 can include respective subsequent queries, such as query 208 (e.g., a level-4 query) for option 236. Options 242, 244, and 246 can be the options or choices for a response to query 208. Flowchart 142 can continue to include queries and options for each branch or path until a solution is reached.

To generate the DAG from flowchart 142, development architecture 130 can perform a prune operation 252, which can prune any cyclic edges. Development architecture 130 can also perform a split operation 254, which can split a respective node of flowchart 142 into three nodes: a machine utterance node, an observation node, and a user utterance node. In this example, prune operation 252 can prune restart option 232 to remove the corresponding cycle. Furthermore, split operation 254 can split node 210 into a first node representing query 210, a second node representing options 212, 214, 216, and 218, and a third node representing system 110's observation of the user's selection. Based on operations 252 and 254, every path from the root to a leaf in flowchart 142 becomes acyclic, the choices at each node can be mutually exclusive, and every path can include machine utterances followed by observations, and user decision points.

Figure 2B:
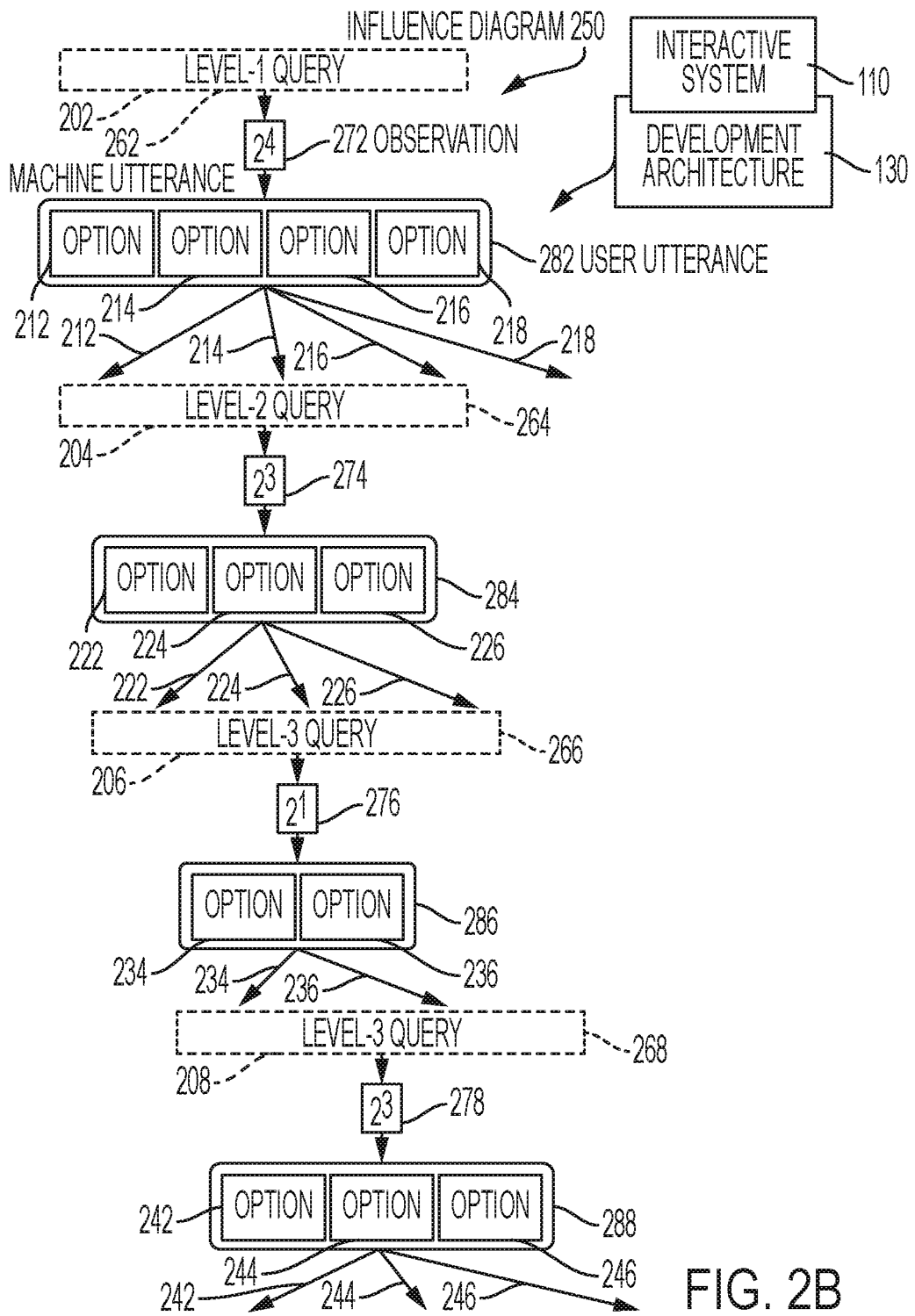
FIG. 2B illustrates an exemplary influence diagram for an efficient search-based interactive system, in accordance with an embodiment of the present application.

FIG. 2B illustrates an exemplary influence diagram for an efficient search-based interactive system, in accordance with an embodiment of the present application. In this example, an influence diagram (ID) 250 can represent the decision conditions associated with the DAG. Hence, ID 250 can be another structured representation of the DAG. In ID 250, the dependencies can correspond to the probability of selecting a particular choice, which can initially be set to uniform. The probabilities can indicate the relative frequency with which paths are traversed in ID 250 for troubleshooting. The utterance nodes of ID 250 can be represented with strings. In ID 250, machine utterances 262, 264, 266, and 268 can be denoted with dashed rectangles (i.e., formed with dashed lines) with a string. Machine utterances 262, 264, 266, and 268 are followed by observations 272, 274, 276, and 278, respectively. A respective observation can be denoted with rectangles with Boolean n-tuples. User utterances 282, 284, 286, and 288 follow the corresponding observations. In ID 250, a respective user utterance can be denoted with rounded boxes with a sequence of strings, each representing one of the options for the corresponding machine utterance. Here, an utterance or observation corresponds to a node in ID 250.

For the observations, $2^n$ represents the domain of Boolean n-tuples, where a value of "1" in position i of a tuple can represent a positive result for the observation reported by coordinate i of the utterances in the immediately following user utterance node. Here, the options in the user utterance node may not be mutually exclusive. To represent this situation, when there are n options for the user, system 110 can determine that the user has selected zero or more options for the corresponding machine utterance, represented by the Boolean n-tuple. For example, observation 274 can include three Boolean variables corresponding to respective options in user utterance 284. If the user's utterance corresponds to option 224, observation 274 at the previous state can be (0, 1, 0). On the other hand, if the user's utterance corresponds to options 222 and 224, observation 274 at the previous state can be <1, 1, 0>. Hence, the size of the domain for observation 274 can be $2^3$. Since the choices in traditional flowcharts may not be mutually exclusive, the Boolean n-tuple can represent the choices selected by the user.

Development architecture 130 can separately manage the cases where the user's answers correspond to mutually exclusive observations. After option 232 is removed, as shown in FIG. 2A, user utterance 286 can include options 234 and 236. If these options are "yes" and "no," respectively, development architecture 130 can consider observation 276 as one observation. Hence, observation 276 can have a domain of size $2^1=2$ (e.g., <1>|<0>). In this way, the dialogue model can become more flexible based on the generalized access to informative points in ID 250. Accordingly, if the user describes a distinctive symptom, ID 250 can guide the user toward the available diagnosis without starting at the root, as flowcharts may require.

Figure 3:
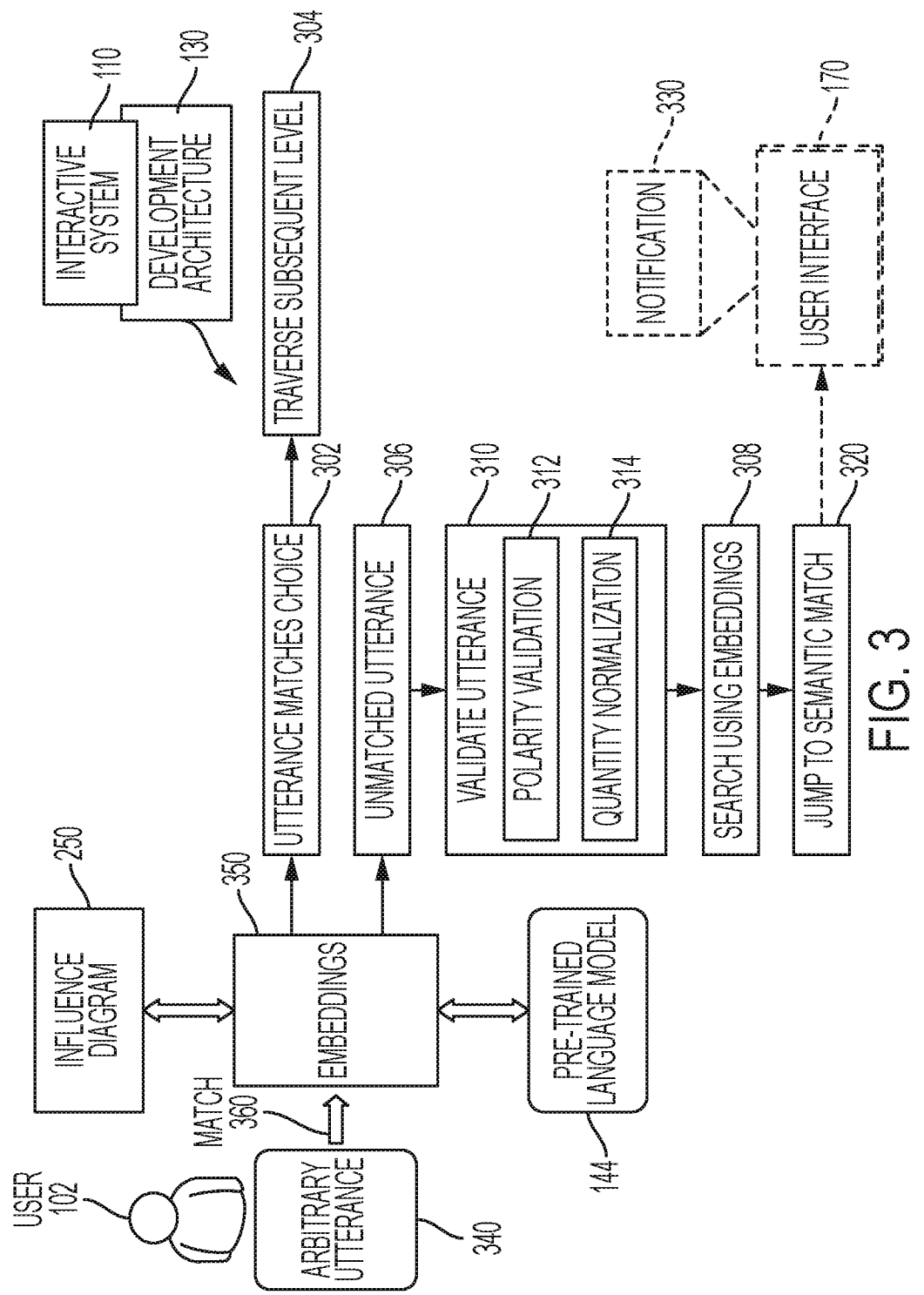
FIG. 3 illustrates an exemplary searching process of an efficient search-based interactive system for troubleshooting, in accordance with an embodiment of the present application.

FIG. 3 illustrates an exemplary searching process of an efficient search-based interactive system for troubleshooting, in accordance with an embodiment of the present application. To match an arbitrary utterance 340 from user 102 to an option in ID 250, development architecture 130 can determine embeddings 350 of pre-trained language model 144 for a respective node of ID 250. During operation, system 110 can receive utterance 340 using NLP based on a voice signal from user 102. System 110 can perform a matching operation 360 on embeddings 350 with utterance 340 as an input. In some embodiments, system 110 can use cosine similarity to determine a match. If utterance 340 matches a choice or option in ID 250 (operation 302), system 110 can continue to traverse ID 250 to a subsequent level (operation 304). Such traversal can include offering a machine utterance corresponding to the option and/or offering a solution to user 102.

On the other hand, if utterance 340 does not match an option in ID 250 (operation 306), system 110 can determine whether a semantic match can be determined for an option in ID 250. In other words, system 110 can allow the semantic search to choose the next dialogue of ID 250 based on semantic similarity without relying on the structure of ID 250. Such an option can be a descendant of the current node or in a different branch of ID 250. Even though the semantic similarity (e.g., determined by cosine similarity) can provide generalization, some elements may not be generalized, such as the difference between polarity (e.g., "yes" and "no") and quality (e.g., "less than 5" and "less than 50"). Accordingly, system 110 can validate utterance 340 (operation 310) prior to exploring semantic similarity for such an option in ID 250.

For the validation, system 110 can then perform polarity validation (operation 312). Since a negation can be expressed in different ways, a dialog interface needs to accommodate the different ways utterance 340 may include a negative expression. To do so, system 110 can use a generic detection tool to determine the negative expression because a negative expression may not be domain specific. For example, the phrase "no" can be a negative expression regardless of the underlying product for which the troubleshooting is being performed. A generic detection tool, such as Bidirectional Encoder Representations from Transformers (BERT) and its variants and Bidirectional long-short term memory (BiLSTM), can allow system 110 to tag the negative expressions.

To facilitate the validation, system 110 can also perform quantity normalization (operation 314). Since numerical systems in the world can be standardized and similar, a numerical expression can be determined based on generic tools. In some embodiments, system 110 can use finite state transduction to normalize a numerical expression in utterance 340. However, the numerical expression may also include model and/or part numbers. System 110 can crosscheck with the numerical expressions associated with the product prior to the normalization process. Furthermore, system 110 can also use domain-specific methods to determine a semantic match associated with the model and/or part numbers.

Upon validation, system 110 can perform a search for a semantic match for utterance 340 based on embeddings 350 (operation 308). If system 110 can detect a semantic match, system 110 can jump to the semantic match (operation 320). Using the jump, system 110 may shorten the path to a resolution. System 110 can also show a notification 330 on user interface 170, which can indicate that the jump is not to a descendant and to the new path in ID 250. User 102 may need to confirm the jump (e.g., based on a choice offered on notification 330) before system 110 can proceed to the jump step. In this way, system 110 can maintain the structure of ID 250 while offering a jump step to user 102 when the validated semantic match with another option is better than the anticipated choices.

Operations

Figure 4:
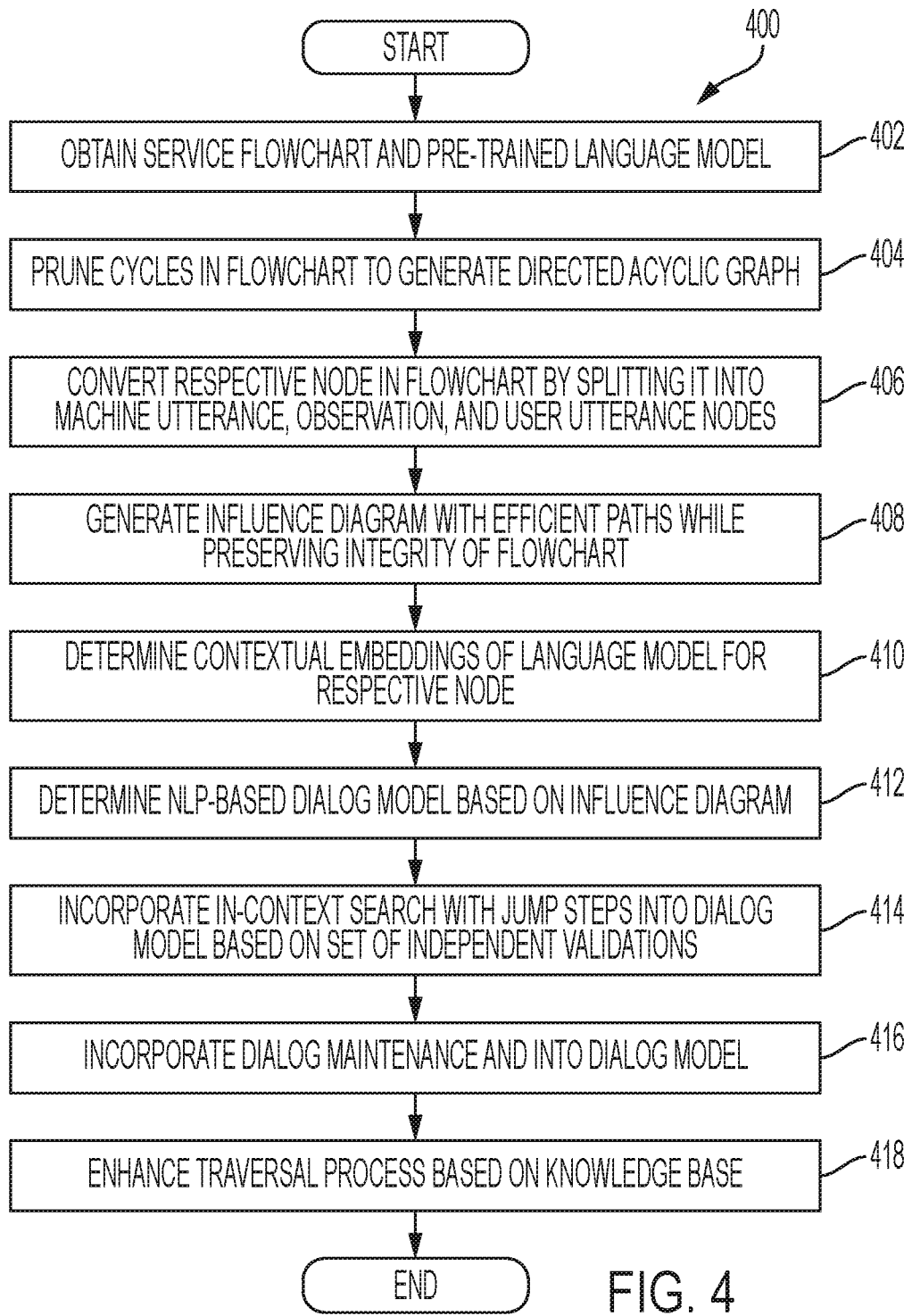
FIG. 4 presents a flowchart illustrating a method of a development architecture determining an efficient search-based interactive system for troubleshooting, in accordance with an embodiment of the present application.

FIG. 4 presents a flowchart 400 illustrating a method of a development architecture determining an efficient search-based interactive system for troubleshooting, in accordance with an embodiment of the present application. During operation, the development architecture can obtain a service flowchart and a pre-trained language model (operation 402) and prune the cycles in the flowchart to generate a DAG (operation 404). The development architecture can then convert a respective node in the flowchart by splitting it into machine utterance, observation, and user utterance nodes (operation 406). Subsequently, the development architecture can generate an ID with efficient paths while preserving the integrity of the flowchart (operation 408).

The development architecture can determine contextual embeddings of the language model for a respective node (operation 410). The development architecture can determine an NLP-based dialog model based on the influence diagram (operation 412) and incorporate in-context search with jump steps into the dialog model based on a set of independent validations (operation 414). The development architecture can then incorporate dialog maintenance into the dialog model (operation 416). The development architecture may also enhance the traversal process based on the knowledge base (e.g., expert knowledge) (operation 418).

Figure 5A:
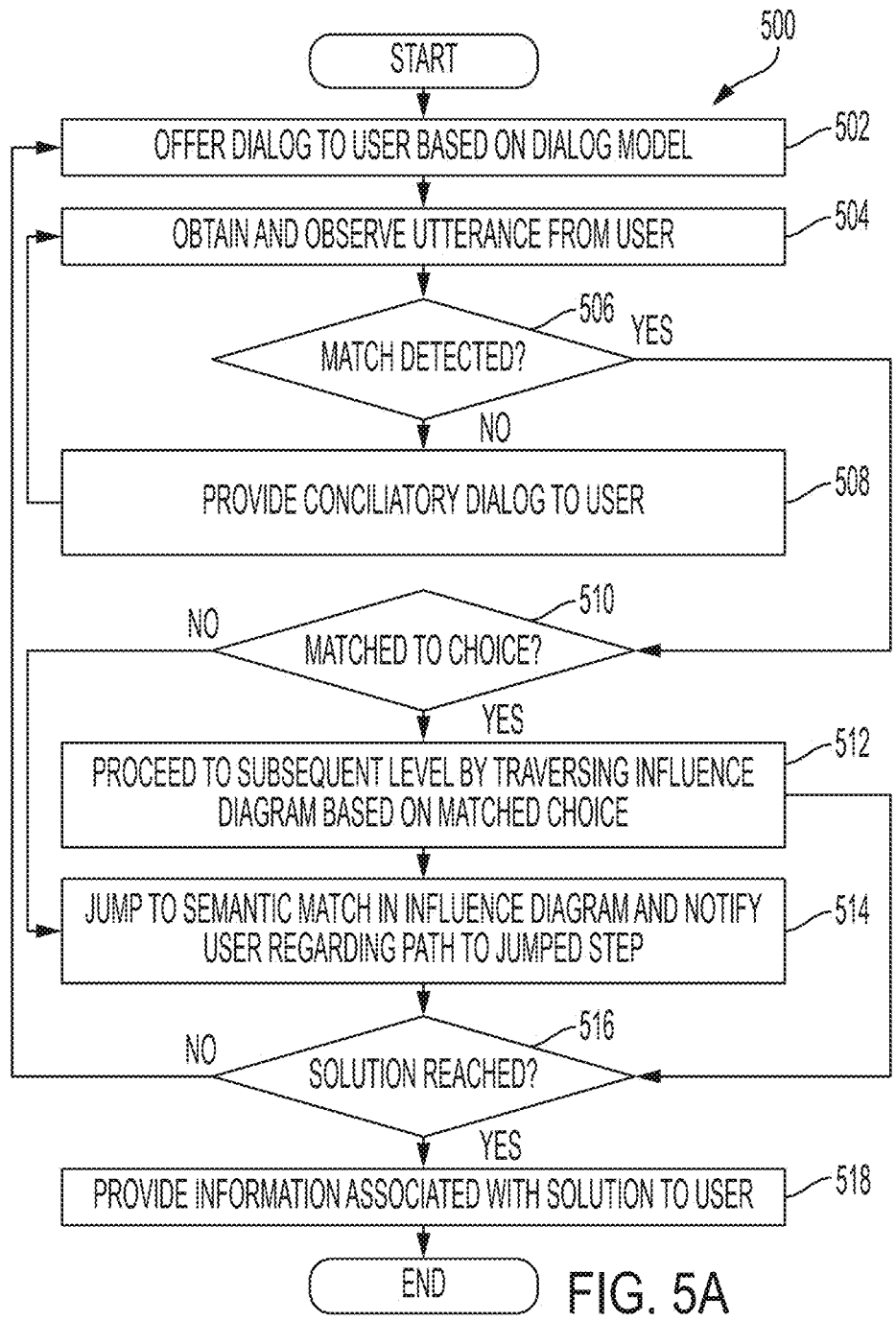
FIG. 5A presents a flowchart illustrating a method of an efficient search-based interactive system providing troubleshooting assistance to a user, in accordance with an embodiment of the present application.

FIG. 5A presents a flowchart 500 illustrating a method of an efficient search-based interactive system providing troubleshooting assistance to a user, in accordance with an embodiment of the present application. During operation, the system can offer a dialog (e.g., a machine utterance) to a user based on the dialog model of the system (operation 502). The system can obtain and observe an utterance from the user (operation 504). The system can then determine whether a match is detected (operation 506). The match can include a match to an offered and anticipated option or a semantic match to a jump step.

If no match is detected, the system may provide a conciliatory dialog to the user (e.g., requesting the user to try again) (operation 508) and continue to obtain and observe an utterance from the user (operation 504). On the other hand, if a match is detected, the system can determine whether the user's utterance is matched to a choice (operation 510). If the user's utterance is matched to a choice, the system can proceed to a subsequent level by traversing the influence diagram based on the matched choice (operation 512). If the user's utterance is not matched to a choice, the system can jump to a semantic match in the influence diagram and notify the user regarding a path to the jumped step (operation 514).

Upon proceeding to the subsequent level (operation 512) or to the jump step (operation 514), the system can determine whether a solution is reached (operation 516). If a solution is not reached, the system can continue to offer a dialog to the user based on the dialog model (operation 502). On the other hand, if a solution is reached, the system can provide information associated with the solution to the user (operation 518). The system can provide a notification or a piece of information to the user on a user interface (e.g., on a graphical user interface) or based on a machine utterance (e.g., based on a voice prompt).

Figure 5B:
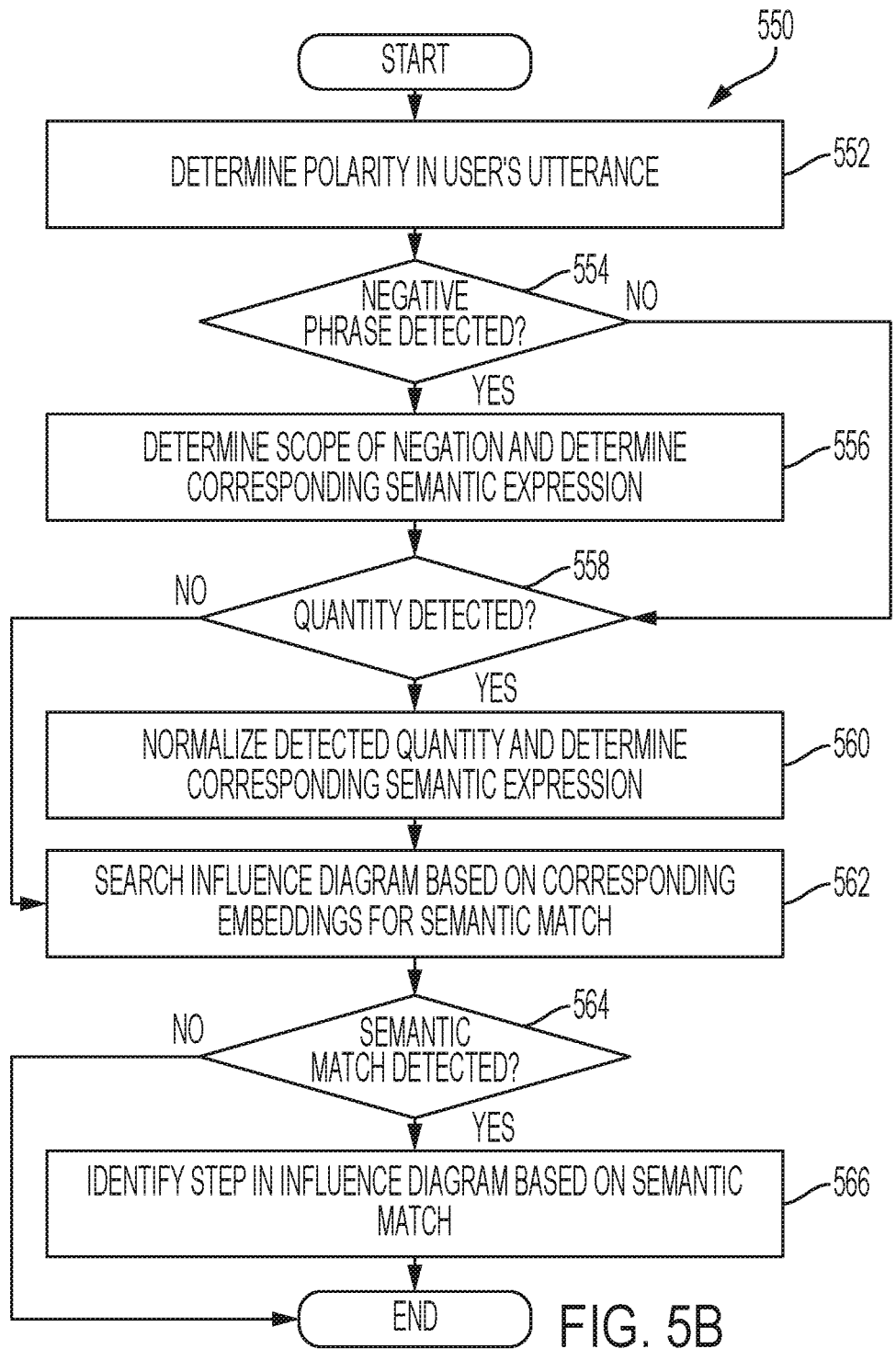
FIG. 5B presents a flowchart illustrating a method of an efficient search-based interactive system determining a semantic match for providing troubleshooting assistance to a user, in accordance with an embodiment of the present application.

FIG. 5B presents a flowchart 550 illustrating a method of an efficient search-based interactive system determining a semantic match for providing troubleshooting assistance to a user, in accordance with an embodiment of the present application. During operation, the system can determine polarity in the user's utterance (operation 552) and determine whether a negative phrase is detected in the utterance (operation 554). If a negative phrase is detected, the system can determine the scope of the negation and determine the corresponding semantic expression (operation 556).

If a negative phrase is not detected (operation 554) or upon determining the corresponding semantic expression for the negative phrase (operation 556), the system can determine whether a quantity is detected (operation 558). If a quantity is detected, the system can normalize the detected quantity and determine the corresponding semantic expression (operation 560). If a quantity is not detected (operation 558) or upon determining the corresponding semantic expression for the quantity (operation 560), the system can search the influence diagram based on the corresponding embeddings for a semantic match (operation 562).

The system can then determine whether a semantic match is detected (operation 564). If a semantic match is detected, the system can identify a step in the influence diagram based on the semantic match (operation 566). The match can include a match to an offered and anticipated option or a semantic match to a jump step. Furthermore, the jump step in the influence diagram can correspond to a machine utterance or a user utterance.

Exemplary Computer System and Apparatus

Figure 6:
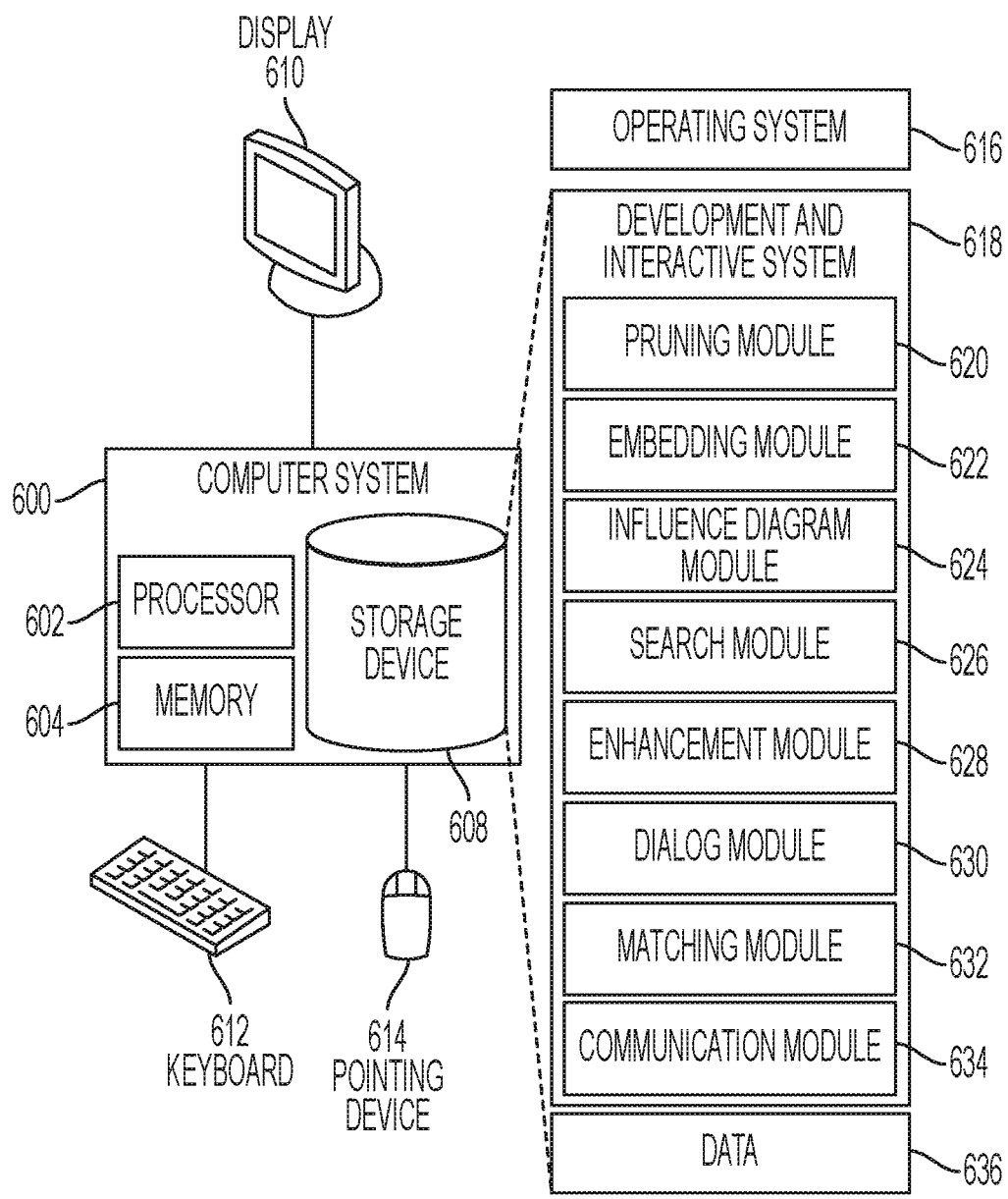
FIG. 6 illustrates an exemplary computer system that determines and facilitates an efficient search-based interactive system for troubleshooting, in accordance with an embodiment of the present application.

FIG. 6 illustrates an exemplary computer system that determines and facilitates an efficient search-based interactive system for troubleshooting, in accordance with an embodiment of the present application. Computer system 600 includes a processor 602, a memory device 604, and a storage device 608. Memory device 604 can include a volatile memory device (e.g., a dual in-line memory module (DIMM)). Furthermore, computer system 600 can be coupled to a display device 610, a keyboard 612, and a pointing device 614. Storage device 608 can store an operating system 616, a development and interactive system 618, and data 636. Development and interactive system 618 can facilitate the operations of development architecture 150 and/or interactive system 110 of FIG. 1A.

Development and interactive system 618 can include instructions, which when executed by computer system 600 can cause computer system 600 to perform methods and/or processes described in this disclosure. Specifically, development and interactive system 618 can include instructions for pruning a service flowchart to generate a DAG for an interactive system (pruning module 620). Development and interactive system 618 can also include instructions for splitting a respective node of the flowchart to machine utterance, observation, and user utterance nodes in the DAG for the interactive system (pruning module 620). Furthermore, development and interactive system 618 includes instructions for determining respective embeddings of a language model for the nodes for the interactive system (embedding module 622).

Development and interactive system 618 can also include instructions for generating an influence diagram based on the DAG for the interactive system (influence diagram module 624). Moreover, development and interactive system 618 can also include instructions for determining a dialog model based on the influence diagram (influence diagram module 624). Development and interactive system 618 can also include instructions for incorporating in-context semantic search, which can include a jump step to a semantic match, into the interactive system (search module 626).

Development and interactive system 618 can further include instructions for augmenting the dialog model with dialog maintenance (enhancement module 628). In addition, development and interactive system 618 can further include instructions for incorporating traversal based on the knowledge base into the interactive system (enhancement module 628). Development and interactive system 618 can include instructions for offering machine utterances, obtaining corresponding user utterances, and determining respective observations from the user utterances while operating as the interactive system (e.g., based on the dialog model) (dialog module 630).

Development and interactive system 618 can also include instructions for determining a semantic match while operating as the interactive system, thereby facilitating traversal through the influence diagram (matching module 632). The semantic match can include a match to an offered and anticipated option or a semantic match to a jump step. Development and interactive system 618 may further include instructions for sending and receiving messages (communication module 634). Data 636 can include any data that can facilitate the operations of development architecture 150 and/or interactive system 110 of FIG. 1A.

Figure 7:
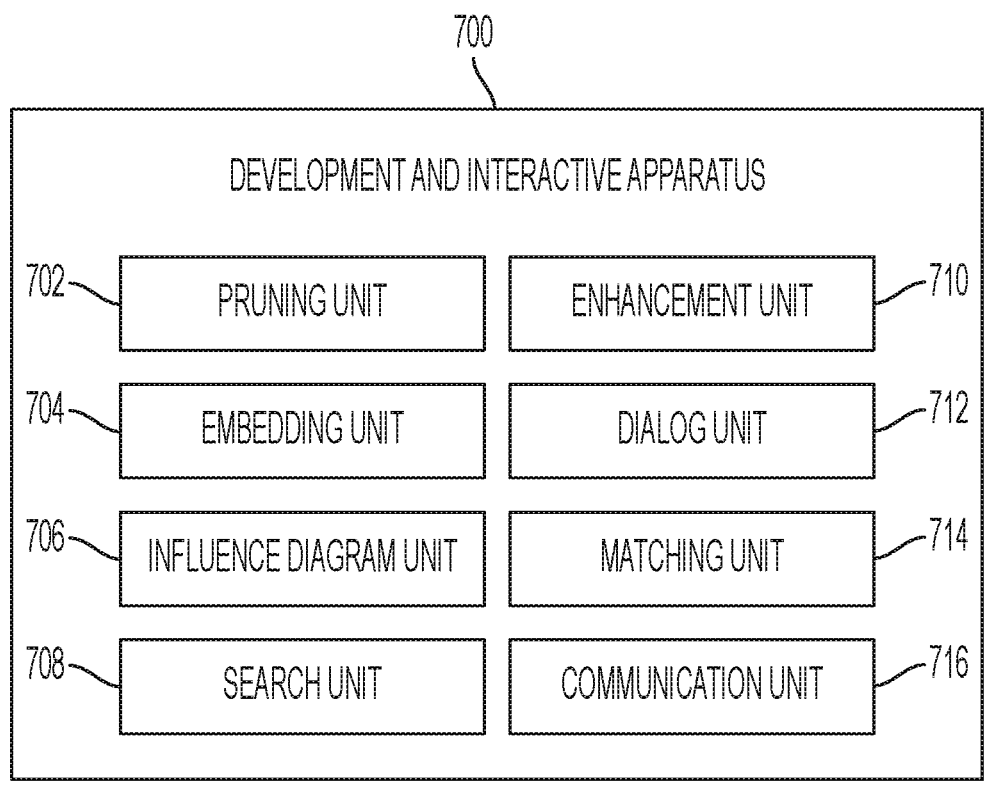
FIG. 7 illustrates an exemplary apparatus that determines and facilitates an efficient search-based interactive system for troubleshooting, in accordance with an embodiment of the present application.

FIG. 7 illustrates an exemplary apparatus that determines and facilitates an efficient search-based interactive system for troubleshooting, in accordance with an embodiment of the present application. Development and interactive apparatus 700 can comprise a plurality of units or apparatuses which may communicate with one another via a wired, wireless, quantum light, or electrical communication channel. Apparatus 700 may be realized using one or more integrated circuits, and may include fewer or more units or apparatuses than those shown in FIG. 7. Further, apparatus 700 may be integrated in a computer system, or realized as a separate device that is capable of communicating with other computer systems and/or devices. Specifically, apparatus 700 can comprise units 702-716, which perform functions or operations similar to modules 620-634 of computer system 600 of FIG. 6, including: a pruning unit 702; an embedding unit 704; an influence diagram unit 706; a search unit 708; an enhancement unit 710; a dialog unit 712, a matching unit 714, and a communication unit 716.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-executable method for facilitating efficient troubleshooting for a product, the method comprising:
   storing, by a computer system, a service flowchart associated with the troubleshooting for the product, wherein the service flowchart indicates sequential troubleshooting steps to be performed by a user;
   identifying, by the computer system, an artificial-intelligence- (AI-) based dialog model operating based on the service flowchart;
   incorporating in-context embeddings of a pre-trained language model associated with the dialog model into the service flowchart;
   providing, by the computer system, a machine utterance of the dialog model corresponding to a troubleshooting step indicated in the service flowchart for the product to the user;
   performing, based on the in-context embeddings, a semantic search on the service flowchart for a semantic match for a user utterance obtained as a response to the machine utterance in accordance with the dialog model from the user;
   in response to the semantic match indicating an anticipated option associated with the machine utterance, traversing a current branch subsequent to the troubleshooting step of the service flowchart using the dialog model based on the anticipated option; and
   in response to the semantic match indicating an option on a different branch, which is distinct from the current branch, of the service flowchart, jumping to the option on the different branch and subsequently traversing the different branch.

2. The method of claim 1, wherein the service flowchart includes an influence diagram derived from the acyclic flowchart.

3. The method of claim 1, wherein a respective troubleshooting step in the service flowchart comprises a sequence of a machine utterance node, an observation node, and a set of user utterance nodes, wherein a respective user utterance node corresponds to an anticipated option.

4. The method of claim 1, wherein the language model is pre-trained for nodes of the service flowchart.

5. The method of claim 4, wherein performing the semantic search further comprises:
   searching the user utterance against the in-context embeddings; and
   identifying a node of the service flowchart whose in-context embedding provides a target match.

6. The method of claim 1, wherein, prior to jumping to the option on the different branch, the method further comprises:
   performing a set of independent checks on the user utterance; and in response to obtaining validation from the set of independent checks, proceeding with the jumping.

7. The method of claim 6, wherein the set of independent checks comprises one or more of:
   polarity validation in the user utterance;
   quantity normalization in the user utterance; and
   a confirmation from the user based on a notification indicating the option on the different branch.

8. The method of claim 1, wherein the semantic match indicates the option on the different branch of the service flowchart by matching the option on the different branch based on a knowledge base derived from prior expert knowledge.

9. The method of claim 1, wherein the dialog model is augmented with dialog maintenance.

10. A non-transitory computer-readable storage medium storing instructions that when executed by a computer cause the computer to perform a method for facilitating efficient troubleshooting for a product, the method comprising:
   storing a service flowchart associated with the troubleshooting for the product, wherein the service flowchart indicates sequential troubleshooting steps to be performed by a user;
   identifying an artificial-intelligence- (AI-) based dialog model operating based on the service flowchart;
   incorporating in-context embeddings of a language model associated with the dialog model into the service flowchart;
   providing a machine utterance of the dialog model corresponding to a troubleshooting step indicated in the service flowchart for the product to the user;
   performing, based on the in-context embeddings, a semantic search on the service flowchart for a semantic match for a user utterance obtained as a response to the machine utterance in accordance with the dialog model from the user;
   in response to the semantic match indicating an anticipated option associated with the machine utterance, traversing a current branch subsequent to the troubleshooting step of the service flowchart using the dialog model based on the anticipated option; and
   in response to the semantic match indicating an option on a different branch, which is distinct from the current branch, of the service flowchart, jumping to the option on the different branch and subsequently traversing the different branch.

11. The non-transitory computer-readable storage medium of claim 10, wherein the service flowchart includes one or more of: an acyclic flowchart and an influence diagram derived from the acyclic flowchart.

12. The non-transitory computer-readable storage medium of claim 10, wherein a respective troubleshooting step in the service flowchart comprises a sequence of a machine utterance node, an observation node, and a set of user utterance nodes, wherein a respective user utterance node corresponds to an anticipated option.

13. The non-transitory computer-readable storage medium of claim 10, wherein the language model is pre-trained language model for nodes of the service flowchart.

14. The non-transitory computer-readable storage medium of claim 13, wherein performing the semantic search further comprises:
   searching the user utterance against the in-context embeddings; and
   identifying a node of the service flowchart whose in-context embedding provides a target match.

15. The non-transitory computer-readable storage medium of claim 10, wherein, prior to jumping to the option on the different branch, the method further comprises:
   performing a set of independent checks on the user utterance; and
   in response to obtaining validation from the set of independent checks, proceeding with the jumping.

16. The non-transitory computer-readable storage medium of claim 15, wherein the set of independent checks comprises one or more of:
   polarity validation in the user utterance;
   quantity normalization in the user utterance; and
   a confirmation from the user based on a notification indicating the option on the different branch.

17. The non-transitory computer-readable storage medium of claim 10, wherein the semantic match indicates the option on the different branch of the service flowchart by matching the option on the different branch based on a knowledge base derived from prior expert knowledge.

18. A computer system, comprising:
   a storage device;
   a processor;
   a non-transitory computer-readable storage medium storing instructions, which when executed by the processor causes the processor to perform a method for facilitating efficient troubleshooting for a product, the method comprising:
      storing a service flowchart associated with the troubleshooting for the product, wherein the service flowchart indicates sequential troubleshooting steps to be performed by a user;
      identifying an artificial-intelligence- (AI-) based dialog model operating based on the service flowchart;
      incorporating in-context embeddings of a language model associated with the dialog model into the service flowchart;
      providing a machine utterance of the dialog model corresponding to a troubleshooting step indicated in the service flowchart for the product to the user;
      performing, based on the in-context embeddings, a semantic search on the service flowchart for a semantic match for a user utterance obtained as a response to the machine utterance in accordance with the dialog model from the user;
      in response to the semantic match indicating an anticipated option associated with the machine utterance, traversing a current branch subsequent to the troubleshooting step of the service flowchart using the dialog model based on the anticipated option; and
      in response to the semantic match indicating an option on a different branch, which is distinct from the current branch, of the service flowchart, jumping to the option on the different branch and subsequently traversing the different branch.

19. The computer system of claim 18, wherein performing the semantic search further comprises:
   searching the user utterance against the in-context embeddings; and
   identifying a node of the service flowchart whose in-context embedding provides a target match.

20. The computer system of claim 18, wherein, prior to jumping to the option on the different branch, the method further comprises:
   performing a set of independent checks on the user utterance; and in response to obtaining validation from the set of independent checks, proceeding with the jumping.

* * * * *